United States Patent [19]

Go

[11] 4,093,593

[45] June 6, 1978

[54] POLYESTER STABILIZATION, AND COMPOSITION

[75] Inventor: Santos W. Go, Toledo, Ohio

[73] Assignee: Owens-Illinois, Inc., Toledo, Ohio

[21] Appl. No.: 833,192

[22] Filed: Sep. 14, 1977

[51] Int. Cl.$^2$ ............................................. C08K 5/09
[52] U.S. Cl. ........................................... 260/45.85 P
[58] Field of Search ....... 260/75 R, 45.85 P, 31.8 XA

[56] References Cited

U.S. PATENT DOCUMENTS

| | | | |
|---|---|---|---|
| 2,437,232 | 3/1948 | Rothrock et al. | 260/75 R |
| 3,227,680 | 1/1966 | Tamblyn et al. | 260/45.85 P |
| 3,887,521 | 6/1975 | Blocker et al. | 260/45.85 P |

OTHER PUBLICATIONS

Mendeleev Chemistry Journal–vol. 11, No. 3, May–Jun. 1966, published 1969–Faraday Press Inc. Translation of Zhurnal Vses., Khim., Ob–va im, Mendeleeva–pp. 203 and 204.

*Primary Examiner*—Veronica P. Hoke
*Attorney, Agent, or Firm*—Charles S. Lynch; E. J. Holler

[57] ABSTRACT

Saturated polyesters are stabilized against thermal degradation to yield acetaldehyde by forming an intimate admixture of said polyester and 5-hydroxy isophthalic acid.

2 Claims, No Drawings

POLYESTER STABILIZATION, AND COMPOSITION

This invention relates to novel, heat-stable polyester compositions. More particularly, this invention relates to saturated polyesters having

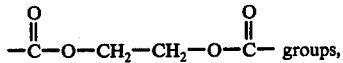

stabilized against thermal decomposition to yield chiefly acetaldehyde. The present invention reduces the acetaldehyde generation rate.

The term "saturated polyester" encompasses a wide variety of materials which are of significant industrial and economic importance. Well-known polyester meterials include polyester fibers, polyester tire cord, plasticizers alkyds and polyester molding resins suitable for extrusion, injection and blow molding plastic articles.

For the puruse of this invention it is intended to include those saturated polyesters having linear chainlike structures, which include in their backbone

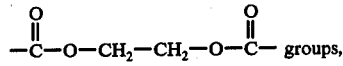

derived by reacting compounds such as dicarboxylic acids or their acid functioning derivatives with dihydric alcohols, including ethylene glycol; and those polyesters having cross-linked, three dimensional structures derived by reacting di- or polycarboxylic acids with diols an polyols, always including a significant portion of ethylene glycol; said polyesters or copolyesters may contain alkyl or aryl or cycloalkyl or other groups which are not ethylenically unsaturated. The end valences of said

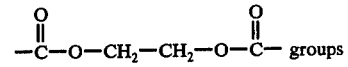

are of course bonded to carbon atoms as will be understood.

It is well known to those skilled in the art that most polyesters are relatively stable materials as compared with other types of polymers, e.g., polyvinyl acetate, polystyrene, polyurethane, etc. It is also well-known, however, that when saturated polyesters are exposed to high temperatures, as they often must during processing and application from the molten state, they tend to degrade with detrimental loss of physical and chemical properties. This condition often results in inferior products at best, or worse, it renders these materials useless in the intended application thereby contributing to substantial economic losses to manufacturer and end-user alike.

More specifically, with the growing use of plastic bottles for beverages such as carbonated soft drinks and beer it has been found to be important that the container wall have a low concentration of acetaldehyde; otherwise the taste of the beverage is deleteriously affected and the container cannot be used. In particular, the invention is useful in poly(ethylene terephthalate) resins widely used for bottles for packaging carbonated soft drinks; such polymers contain in their polymer backbone a major weight portion of ethylene terephthalate units of the structure

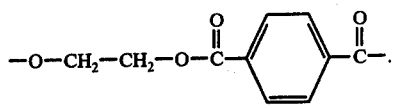

It is an object of the present invention to provide a method for stabilizing a saturated polyester resin containing

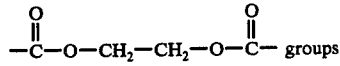

against thermal degradation.

Another object of the invention is to provide a saturated polyester resin stabilized against generation of acetaldehyde at elevated temperatures.

Other objects, features and advantages of the invention will become apparent upon a study of the accompanying disclosure.

According to the present invention there is provided a process whereby stability of a saturated polyester, containing

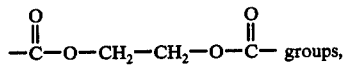

toward acetaldehyde generation is increased by intimately admixing from 0.3 to 3 percent by weight of said polyester, of 5-hydroxy isophthalic acid.

According to another aspect of the present invention there is provided a saturated polyester stabilized against thermal degradation to yield acetaldehyde which comprises (1) a saturated polyester having

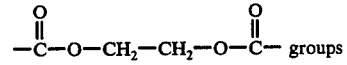

in its backbone and blended therewith (2) 0.3 to 3 weight percent of the polyester, of 5-hydroxy isophthlic acid.

The saturated polyester composition of the present invention can be made by adding and intimately admixing the 5-hydroxy isophthalic acid at any stage of the polymerization process to form the polyester or subsequent to the polymerization process, although it is generally preferred to blend the 5-hydroxy isophthalic acid after the polymerization reaction is in advanced stages or is completed to the degree desired.

Suitable methods of preparing saturated polyesters to be stabilized according to the invention are disclosed in U.S. Pat. Nos. 2,465,310 and 2,623,031 and in "Polymers and Resins", pp. 283—9, D. Van Nostrand Co., Inc., 1959.

In a specific illustration of the present invention the following work was carried out:

Three mg. of 5-hydroxy isophthalic acid was added to 600 mg. of powdered poly (ethylene terephthalate) in a small test tube. The polymer had an intrinsic viscosity of about 1.04 and a melting point of about 260° C. The mixture was blended by rotating the test tube and then dried in a vacuum oven at 90° C for 12 hours. Six samples were prepared, as well as control samples having no added stabilizer. The test tubes were then sealed under nitrogen atmosphere. The acetaldehyde generated after 5, 10, 15, 20, 25, and 30 min. heating times at 280° C was measured using a gas chromatograph instrument. Similar tests were made at 295° C. Measurments were conducted after the test tubes had cooled to room temperature. The results are as follows:

A. Temperature 280° C. Acetaldehyde concentration expressed in ppm wt/wt.

|   | 5 Min | 10 Min | 15 Min | 20 Min | 25 Min | 30 Min |   |
|---|-------|--------|--------|--------|--------|--------|---|
| PET | 5.8 | 10.2 | 13.0 | 19.9 | 25.9 | 32.4 | ppm |
| PET + Additive | 3.2 | 5.1 | 7.6 | 11.9 | 15.5 | 18.3 | ppm |

B. Temperature 295° C. Acetaldehyde concentration expressed in ppm wt/wt.

|   | 5 Min | 15 Min | 20 Min | 25 Min |   |
|---|-------|--------|--------|--------|---|
| PET | 6.5 | 33.2 | 52.9 | 67.8 | ppm |
| PET + Additive | 4.2 | 22.7 | 34.7 | 50.6 | ppm |

The "acetaldehyde concentration" is that obtained by dividing the weight of the original polymer sample into the total weight of acetaldehyde found in the vapor phase of the test tubes. Wile the acetaldehyde found does not take into account that which is dissolved in the molten polymer, the comparative data nevertheless shows the additive stabilizes the polyester, retarding the generation of acetaldehyde.

As will be evident to those skilled in the art, various modificaations of this invention can be made or followed in the light of the foregoing disclosure and discussion without departing from the spirit and scope of the disclosure or from the scope of the claims.

I claim:

1. A saturated polyester composition stabilized against thermal degradation to yield acetaldehyde which comprises (1) a saturated polyester having

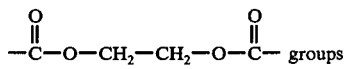

in its backbone and blended therewith (2) 0.3 to 3 weight percent of the polyester, of 5-hydroxy isophthalic acid.

2. A method for stabilizing a saturated polyester containing

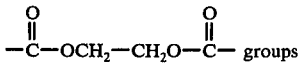

which comprises forming an intimate admixture of said polyester with 0.3 to 3 parts by weight of 5-hydroxy isophthalic acid per 100 parts by weight of said polyester.

* * * * *